US012058505B2

(12) United States Patent
Han et al.

(10) Patent No.: US 12,058,505 B2
(45) Date of Patent: Aug. 6, 2024

(54) SOUNDING DEVICE

(71) Applicant: GOERTEK INC., Weifang (CN)

(72) Inventors: Zhilei Han, Weifang (CN); Huawei Liu, Weifang (CN)

(73) Assignee: GOERTEK INC., Weifang (CN)

( * ) Notice: Subject to any disclaimer, the term of this patent is extended or adjusted under 35 U.S.C. 154(b) by 267 days.

(21) Appl. No.: 17/587,238

(22) Filed: Jan. 28, 2022

(65) Prior Publication Data

US 2022/0159384 A1 May 19, 2022

Related U.S. Application Data

(63) Continuation of application No. PCT/CN2019/128548, filed on Dec. 26, 2019.

(30) Foreign Application Priority Data

Jul. 30, 2019 (CN) ........................ 201910709544.8

(51) Int. Cl.
*H04R 9/02* (2006.01)
*H04R 9/04* (2006.01)
*H04R 9/06* (2006.01)

(52) U.S. Cl.
CPC ............... *H04R 9/06* (2013.01); *H04R 9/025* (2013.01); *H04R 9/046* (2013.01); *H04R 2400/11* (2013.01)

(58) Field of Classification Search
CPC .................. H04R 9/025; H04R 31/006; H04R 2209/024; H04R 2231/001; H04R 2231/003; H04R 2400/11
See application file for complete search history.

(56) References Cited

U.S. PATENT DOCUMENTS 9,584,921 B2 * 2/2017 Shi ......................... H04R 9/025
9,913,043 B2 * 3/2018 Song ........................ H04R 7/20
11,780,131 B2 * 10/2023 Cen .................. B29C 45/14475 264/260

(Continued)

FOREIGN PATENT DOCUMENTS

CN 102685653 A 9/2012
CN 204119510 U 1/2015

(Continued)

OTHER PUBLICATIONS

First Office Action issued in corresponding Chinese Application No. 201910709544.8; mailed Jun. 15, 2020; 16 pgs.

(Continued)

*Primary Examiner* — Ryan Robinson
(74) *Attorney, Agent, or Firm* — HAUPTMAN HAM, LLP

(57) ABSTRACT

The present application provides a sound production device. The sounding device includes: an outer shell having two ends communicating with each other and comprising a first shell and a second shell, wherein the first shell and the second shell are distributed along a direction from one of the two ends to another of the two end and engaged with each other; a diaphragm integrally formed with the first shell; and a side magnetic conductive plate integrally formed with the second shell. The technical solution of the present application improves the reliability of connection between the side magnetic conductive plate and the shell.

12 Claims, 3 Drawing Sheets

(56) References Cited

U.S. PATENT DOCUMENTS

| | | | | | |
|---|---|---|---|---|---|
| 2002/0071590 | A1* | 6/2002 | Han | H04R 9/025 | 381/420 |
| 2013/0202149 | A1* | 8/2013 | Yoon | H04R 9/025 | 381/433 |
| 2014/0369547 | A1* | 12/2014 | Qingshan | H04R 3/00 | 381/398 |
| 2017/0142239 | A1 | 5/2017 | Bae et al. | | |
| 2018/0014098 | A1* | 1/2018 | Shao | H04R 31/006 | |
| 2020/0221222 | A1* | 7/2020 | Kim | H04R 9/06 | |
| 2022/0210574 | A1* | 6/2022 | Kim | H04R 7/04 | |

FOREIGN PATENT DOCUMENTS

| | | | | | |
|---|---|---|---|---|---|
| CN | 204291373 | U | | 4/2015 | |
| CN | 204442665 | U | | 7/2015 | |
| CN | 105491489 | A | * | 4/2016 | H04R 9/025 |
| CN | 105681977 | A | | 6/2016 | |
| CN | 206226702 | U | | 6/2017 | |
| CN | 107277718 | A | * | 10/2017 | |
| CN | 207124741 | U | | 3/2018 | |
| CN | 107948892 | A | * | 4/2018 | |
| CN | 207475865 | U | | 6/2018 | |
| CN | 207835793 | U | | 9/2018 | |
| CN | 108632727 | A | | 10/2018 | |
| CN | 109040924 | A | | 12/2018 | |
| CN | 208386919 | U | | 1/2019 | |
| CN | 109905822 | A | | 6/2019 | |
| CN | 110366079 | A | | 10/2019 | |
| EP | 3352472 | A1 | * | 7/2018 | H04R 1/023 |
| JP | 2008278146 | A | | 11/2008 | |
| KR | 101318698 | B1 | * | 10/2013 | |
| KR | 101489765 | B1 | * | 2/2015 | |
| WO | 2017215238 | A1 | | 12/2017 | |

OTHER PUBLICATIONS

Second Office Action issued in corresponding Chinese Application No. 201910709544.8; mailed Jan. 4, 2021; 14 pgs.

Third Office Action issued in corresponding Chinese Application No. 201910709544.8; mailed May 18, 2021; 11 pgs.

International Search Report and Written Opinion issued in corresponding International Application No. PCT/CN2019/128548; mailed Apr. 24, 2020; 13 pgs.

* cited by examiner

SOUNDING DEVICE

CROSS REFERENCE TO RELATED APPLICATIONS

The present application is a continuous application of the international application No. PCT/CN2019/128548, filed on Dec. 26, 2019, which claims priority from Chinese Patent Application No. CN201910709544.8, filed on Jul. 30, 2019, the entire contents of which are incorporated herein by reference.

TECHNICAL FIELD

The present application relates to the technical field of acoustic energy conversion, in particular to a sounding device.

BACKGROUND

For a sounding device, the gap between the diaphragm and the shell can be avoided by integrating the diaphragm and the shell, so that a waterproof function can be better realized. However, when the diaphragm and the shell are integrally molded, if a side magnetic conductive plate and the shell are also integrally molded, due to a limitation of the die structure, the diaphragm and the side magnetic conductive plate interfere with each other, resulting in an inability to demould, so the diaphragm and the side magnetic conductive plate cannot be integrally molded with the shell at the same time. At present, the common method is to bond the side magnetic conductive plate with the shell, which leads to poor reliability between the side magnetic conductive plate and the shell.

SUMMARY

The main purpose of the present application is to provide a sounding device for improving the reliability of connection between a side magnetic conductive plate and a shell.

In order to achieve the above purpose, the sounding device provided by the present application includes:

an outer shell having two ends communicating with each other and including a first shell and a second shell, in particular the first shell and the second shell are distributed along a direction from one of the two ends to another of the two end and engaged with each other;

a diaphragm integrally formed with the first shell; and a side magnetic conductive plate integrally formed with the second shell Optionally, an inner circumferential surface of the first shell is provided with a fixing protrusion, an outer edge of the diaphragm is formed with a fixing groove, and the fixing protrusion is embedded in the fixing groove.

Optionally, the fixing protrusion is extended in a circumferential direction of the first shell to form an annular shape, and the fixing groove is extended in a circumferential direction of the diaphragm to form an annular shape.

Optionally, the diaphragm is molded on the first shell by an injection molding process.

Optionally, an outer circumferential surface of the first shell is sleeved with a sealing ring and is sealed and connected with a shell of an electronic equipment.

Optionally, the outer circumferential surface of the first shell is provided with a sealing groove, and the sealing ring is embedded in the sealing groove.

Optionally, the first shell is molded by metal powder injection molding.

Optionally, an inner circumferential surface of the second shell is provided with a mounting groove, and an outer edge of the side magnetic conductive plate is adapted to the mounting groove.

Optionally, the side magnetic conductive plate is in an annular shape, and the mounting groove is extended in a circumferential direction of the second shell to form an annular shape.

Optionally, a surface of the second shell facing away from the first shell is penetrated by the mounting groove.

Optionally, the second shell is a plastic part.

Optionally, the first shell and the second shell are welded or bonded.

Optionally, the sounding device further includes a metal conductive member and a voice coil, one end of the metal conductive member is electrically connected to a lead of the voice coil, and another end of the metal conductive member is exposed outside of the sounding device and be electrically connected to an electronic equipment.

Optionally, the metal conductive member and the second shell are integrally injection molded.

In the present application, the shell of the sounding device is divided into two parts: a first shell and a second shell, so that a diaphragm and the first shell can be integrally formed, an installation of the diaphragm and the first shell is avoided, the tight cooperation between the diaphragm and the first shell is realized, and a good waterproof effect is achieved. In addition, a side magnetic conductive plate and the second shell can be integrally formed, therefore, avoiding the installation of the side magnetic conductive plate and the second shell, ensuring the connection reliability between the side magnetic conductive plate and the second shell and avoiding the separation of the two. By adopting the structure in the embodiments of the present application, the diaphragm and the side magnetic conductive plate are integrally formed with a separate shell, and finally the first shell and the second shell are spliced together, so that a mutual interference between the diaphragm and the side magnetic conductive plate can be avoided.

BRIEF DESCRIPTION OF THE DRAWINGS

In order to more clearly explain the embodiments of the present application or the technical proposal in the related art, the drawings required for use in the description of embodiments or prior art will be briefly described below. It will be apparent that the drawings described below are only some embodiments of the present application, and other drawings may be obtained from the structure shown in these drawings without any creative effort by those of ordinary skill in the art.

The realization of the purpose, functional features and advantages of the present application will be further explained with reference to the accompanying drawings in connection with the embodiment.

DETAILED DESCRIPTION OF THE EMBODIMENTS

A clear and complete description of the technical aspects of the embodiments of the present application will be given below in conjunction with the accompanying drawings in the embodiments of the present application, and it will be apparent that the described embodiments are only part of the embodiments of the present application, not all of them. Based on the embodiments in the present application, all other embodiments obtained without creative effort by those of ordinary skill in the art fall within the scope of the present application.

It should be noted that if the embodiments of the present application relate to directivity indications (such as up, down, left, right, front, back, etc.), the directivity indications are only used to explain the relative positional relationship, motion situation, etc. among the components in a specific posture (as shown in the attached drawings), and if the specific posture is changed, the directivity indications are changed accordingly.

In addition, if there are descriptions relating to “first”, “second”, etc. in embodiments of the present application, the descriptions of “first”, “second” etc. are for descriptive purposes only and cannot be understood as indicating or implying the relative importance of technical features indicated or implying the number of technical features indicated. Therefore, features defined as “first”, “second” may explicitly or implicitly include at least one of the features. In addition, the technical solutions among the various embodiments may be combined with each other, but must be on the basis that the person of ordinary skill in the art can realize it. When the combination of technical solutions conflicts or cannot be realized, it should be considered that the combination of technical solutions does not exist and is not within the scope claimed by the present application.

The present application provides a sounding device, which can be a speaker unit, a speaker module or a terminal electronic device such as a mobile phone, a stereo, etc.

Figure 1:
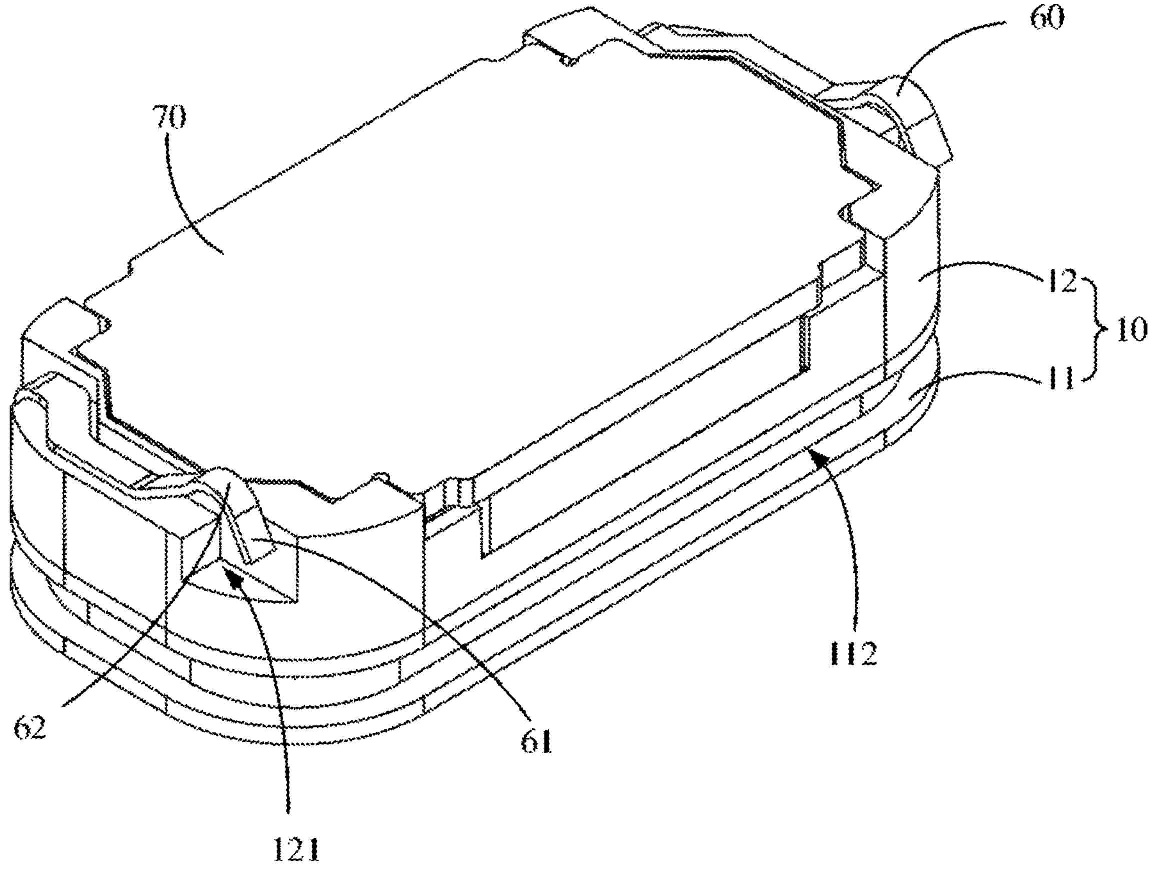
FIG. 1 is a structural schematic view of an embodiment of a sounding device of the present application.
Figure 2:
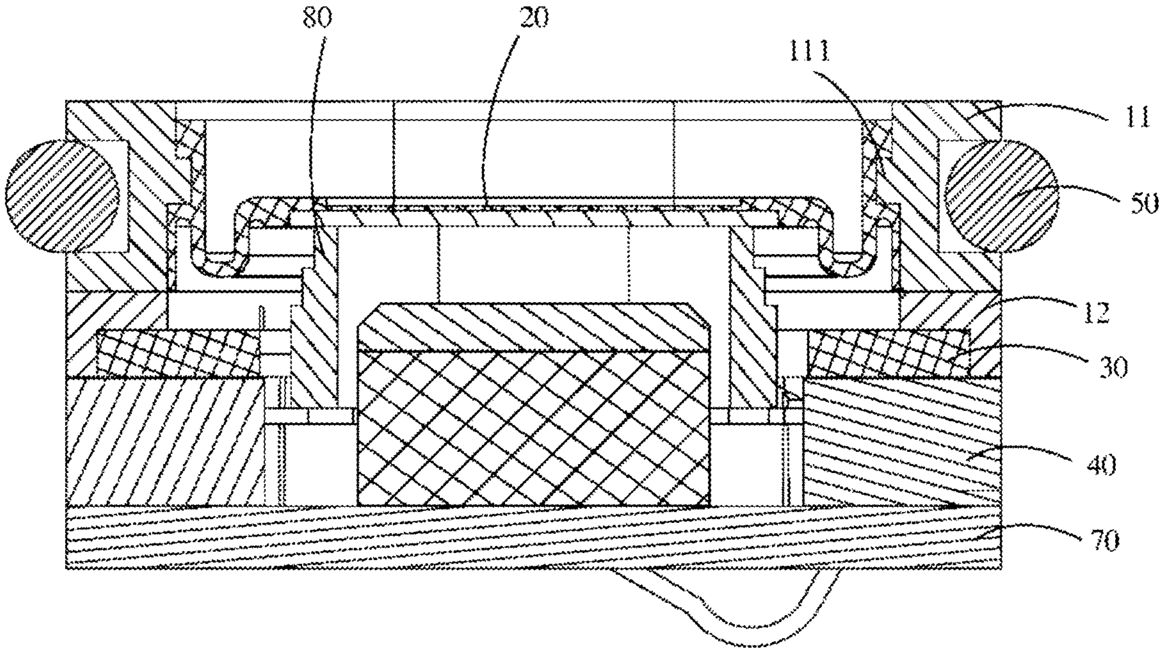
FIG. 2 is a cross-sectional schematic view of the sounding device of FIG. 1.
Figure 3:
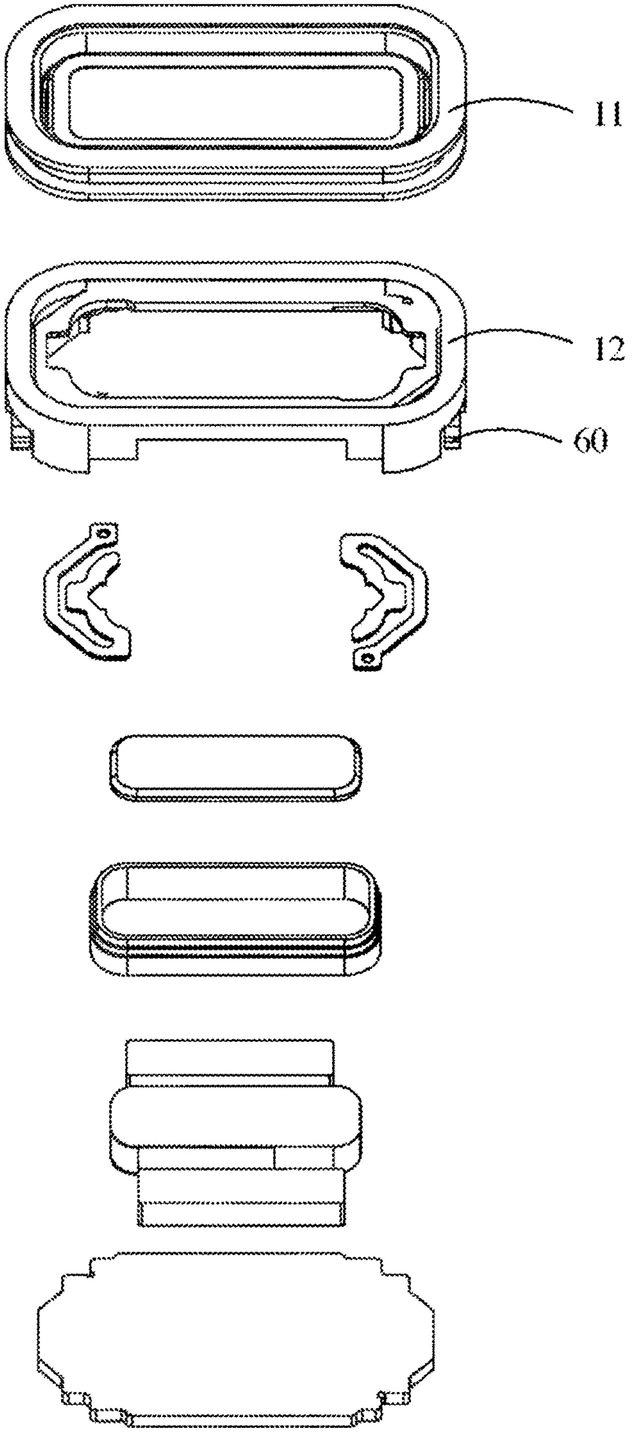
FIG. 3 is an exploded schematic view of the sounding device of FIG. 1.

According to FIGS. 1 to 3, the sounding device includes a shell 10, a vibration system and a magnetic circuit system, and the shell 10 is arranged with two ends communicating with each other. The vibration system is accommodated in the shell 10, and includes a diaphragm 20 and a voice coil 80 connected to each other, and the voice coil 80 is fixed at one side of the diaphragm 20. The magnetic circuit system includes a magnetic conductive yoke 70, on which an inner magnetic circuit system and an outer magnetic circuit system are provided, and a magnetic gap accommodating the voice coil 80 is formed between the inner magnetic circuit system and the outer magnetic circuit system. The outer magnetic circuit system includes an edge magnet 40 and a side magnetic conductive plate 30. The edge magnet 40 is located on the magnetic conductive yoke 70, and the side magnetic conductive plate 30 is located on a surface of the edge magnet 40 facing away from the magnetic conductive yoke 70.

In an embodiment of the present application, the shell 10 includes a first shell 11 and a second shell 12 which are distributed along a through direction and are mutually matched with each other. The first shell 11 and the second shell 12 are both annular and closely matched. The diaphragm 20 is integrally formed with the first shell 11, and the side magnetic conductive plate 30 is integrally formed with the second shell 12. In this embodiment, the diaphragm 20 is integrally molded with the first shell 11, which means that the diaphragm 20, which is an insert, is integrally molded with the first shell 11. Alternatively, the first housing 11 is taken as an insert to be molded with the diaphragm 20 as an insert. Likewise, the side magnetic conductive plate 30 is integrally molded with the second shell 12, which means that the side magnetic conductive plate 30 is taken as an insert to be integrally molded with the second shell 12.

In the present application, by dividing the shell 10 of the sound generating device into two parts: the first shell 11 and the second shell 12, the diaphragm 20 and the first shell 11 can be molded together, an installation of the diaphragm 20 to the first shell 11 is avoided, a tight cooperation between the diaphragm 20 and the first shell 11 is realized, and a good waterproof effect is achieved. Furthermore, the side magnetic conductive plate 30 and the second shell 12 can be molded together to avoid mounting the side magnetic conductive plate 30 to the second shell 12, thereby ensuring a reliability of connection between the side magnetic conductive plate 30 and the second shell 12 and preventing them from being separated from each other. By adopting this structure of the embodiments of the present application, each of the diaphragm 20 and the side magnetic conductive plate 30 is integrally formed with a separate shell, and finally the first shell 11 and the second shell 12 are spliced together, so that mutual interference between the diaphragm 20 and the side magnetic conductive plate 30 can be avoided.

In an embodiment, the diaphragm 20 is molded on the first shell 11 by an injection molding process. That is, after the first case 11 is molded, the diaphragm 20 is directly molded on the first case 11 by the injection molding process, so that the installation between the diaphragm 20 and the first case 11 can be reduced and the tight fit between the diaphragm 20 and the first case 11 can be ensured Specifically, in an embodiment, the first shell 11 is formed by metal powder injection molding (MIM molding). The metal powder injection molding process is a new powder metallurgy near net shaping technology formed by introducing modern plastic injection molding technology into the field of powder metallurgy). The basic technological process is as the following: firstly, solid powder and organic binder are evenly mixed and scoured, after granulation, they are injected into a mold cavity by injection molding machine under heating and plasticizing state, and then the binder in the formed billet is removed by chemical or thermal decomposition method, and finally a final product is obtained by sintering and densification. The first shell 11 may be injection molded from stainless steel powder, such as stainless steel powder 316L, 17-4, 2507, etc. Of course, with the process becoming more and more mature, it is not excluded that other metal powder can be used for the injection molding of the first shell 11, no matter what kind of metal material is used, it is not used to limit the implementation of the present application.

After being molded by the metal powder injection molding process, a thickness of a shell wall of the first shell 11 can be limited to be small, which is beneficial to reducing a volume of the whole product, and at the same time, it is possible to ensure that a strength of the first shell 10 is larger. At the same time, the first shell 11 is not easily deformed when the diaphragm 20 is molded, so that the molded shapes of both of them can be ensured. At this time, the first case 11 is injection molded with metal powder, and after the first case 11 is cooled, the diaphragm 20 is attached to the first case 11 by injection molding. Since the first case 11 is a metal part and has high strength, deformation can be avoided when pressed by the pressure during molding of the diaphragm 20.

In an embodiment, the second shell 12 is a plastic part, which is injection molded. At this time, the side magnetic conductive plate 30 is firstly loaded into a mold, and then the molten liquid of the second case 12 is injected into the mold to be combined with the side magnetic conductive plate 30.

In addition, in other embodiments, the first shell 11 may be a plastic part, and likewise, the second shell 12 may be molded by metal powder injection molding.

According to FIG. 2, in order to ensure stability of connection between the first shell 11 and the diaphragm 20, in one embodiment, an inner circumferential surface of the first shell 11 is provided with a fixing protrusion 111, and an outer circumferential edge of the diaphragm 20 is formed with a fixing groove (not labeled), and the fixing protrusion 111 is embedded in the fixing groove. Alternatively, the fixing protrusion 111 extends to form an annular shape along a circumferential direction of the first shell 11, and the fixing groove extends to form an annular shape along a circumferential direction of the diaphragm 20. In addition, in other embodiments, the inner circumferential surface of the first shell 11 can be provided with a plurality of fixing protrusions 111 which are arranged at intervals along the circumferential direction of the first shell 11. Likewise the fixing grooves may be plural and arranged at intervals along the circumferential direction of the diaphragm 20. By providing the fixing protrusions 111 and the fixing grooves, a contact area between the diaphragm 20 and the first shell 11 can be increased, so that the adhesion force between the diaphragm 20 and the first shell 11 is greater, and a risk of separation of the diaphragm 20 from the first shell 11 can be greatly reduced. In addition, since the annular fixing groove and the annular fixing protrusion 111 are provided, the generation of a gap between the diaphragm 20 and the first shell 11 can be completely avoided, so that a waterproof effect can be improved.

In an embodiment, an outer circumferential surface of the first shell 11 is sleeved with a sealing ring 50 and thus is sealed with a shell of the electronic equipment. Alternatively, the outer circumferential surface of the first shell 11 is provided with an annular sealing groove 112, the sealing groove 112 extends in the circumferential direction of the first shell 11 to form an annular shape, and the sealing ring 50 is embedded in the sealing groove 112. By providing the sealing groove 112, the sealing ring 50 can be prevented from moving up and down and laterally, thereby limiting the position of the sealing ring 50. Moreover, the sealing ring 50 is clamped in a sealing groove 112, so that the contact area between the sealing ring 50 and the first shell 11 is larger, and the sealing effect is better. In addition, the sealing ring 50 may be directly sleeved on an outer circumference of the first shell 11. Alternatively, the sealing ring 50 is specifically a silicone ring. In other embodiments, the sealing ring 50 may be made of other materials as long as it can produce elastic deformation to achieve better sealing.

When the first case 11 is molded by metal powder injection molding, a strength of the first case 11 is relatively high, so that the first case 11 is not easily deformed even when the first case 11 is pressed forcibly when the sealing groove 112 is formed on the outer circumferential surface of the first case 11 and the sealing ring 50 is mounted, thereby ensuring the appearance of the product.

In order to improve stability of connection between the side magnetic conductive plate 30 and the second shell 12, in one embodiment, an inner circumferential surface of the second shell 12 is provided with a mounting groove (not labeled), and an outer edge of the side magnetic conductive plate 30 is adapted to the mounting groove. Alternatively, the side magnetic conductive plate 30 has an annular shape, and the mounting groove extends to form an annular shape along a circumferential direction of the second shell 12. In addition in other embodiments, the side magnetic conductive plates 30 may be plural and the plural side magnetic conductive plates 30 are arranged at intervals along the circumferential direction of the second shell 12. Correspondingly, the second shell 12 is provided with a plurality of mounting grooves, and each side magnetic conductive plate 30 is inserted into one of the mounting grooves. By providing the mounting groove, a contact area between the side magnetic conductive plate 30 and the second shell 12 can be increased, so that the adhesion between them is greater, and a risk of separation of the side magnetic conductive plate 30 from the second shell 12 can be greatly reduced.

In an embodiment, the mounting groove penetrates a surface of the second shell 12 facing away from the first shell 11. The surface of the side magnetic conductive plate 30 facing the magnet conductive yoke 70 is flush with a surface of the second shell 12 facing the magnet conductive yoke 70, that is, the side magnetic conductive plate 30 just fills the mounting groove, and after the side magnetic conductive plate 30 is finally engaged with the edge magnet 40, both the side magnetic conductive plate 30 and the second shell 12 are fitted with the edge magnet 40, therefore, ensuring a smoothness of the fitting and avoiding the generation of gaps.

In the above embodiment, the first shell 11 and the second shell 12 are welded or bonded. Laser welding or adhesive bonding can play a very good waterproof effect.

With reference to FIG. 1, further, the sounding device includes a metal conductive member 60. One end of the metal conductive member 60 is electrically connected with a lead wire of a voice coil 80, and the other end of the metal conductive member 60 is exposed and electrically connected with the machine, i.e., the electronic equipment, so as to realize the power supply of the voice coil 80. Usually, in order to realize the power supply of the voice coil 80, an FPC board (flexible circuit board) is fixed in the sounding device, one end of the FPC board is connected with the voice coil 80, and the other end of the FPC board needs to be bent and out of the sounding device. And by the FPC board's own material limitations, generally the material of the FPC board is PI (polyimide), and has low elasticity and is easy to be broken. At the same time, the bent part of the FPC plate is protruded outside the sounding device, which leads to the bent part easily colliding with other outer structures, and the FPC plate is easily broken in a collision process. At the same time, the bent part is easy to occupy the space of the machine and affect the space of the machine. In this embodiment, the metal conductive member 60 is used instead of the FPC board. Since the metal conductive member 60 has better elasticity, a risk of bending of the metal conductive member 60 can be greatly reduced. At the same time, even if the metal conductive member 60 protrudes outside the sounding device when assembled with the machine, the metal conductive member 60 can be squeezed well because of its good elasticity, so that it can be better fitted with the machine and the sounding device, and the occupation of the space of the machine is greatly reduced. Optionally, the metal conductive member 60 is made of stainless steel.

In this embodiment, the metal conductive member 60 has a first end and a second end 61. The first end is connected with the lead wire of the voice coil 80, and the second end 61 is exposed outside the sounding device and is located on the side where the magnetic conductive yoke 70 is located. The metal conductive member 60 is bent at a position close to the second end 61 to form a bent portion 62 protruding in a direction away from the magnetic conductive yoke 70. The bent portion 62 is configured for electrically connecting with the electronic equipment, and a conductive terminal on the electronic equipment contacts with the bent portion 62 to realize conduction. The bent portion 62 can be protruded on the surface of the magnetic conductive yoke 70 away from the diaphragm 20, so as to make good contact with the conductive terminal of the electronic equipment. Since the metal conductive member 60 has elasticity, when the electronic equipment presses the bent portion 62, the bent portion 62 can be brought close to the sounding device, so as to avoid excessive protrusion outside the sounding device and affecting the space of the machine. In addition, the second shell 12 is provided with an avoidance groove 121 into which the second end 61 extends. When the metal conductive member 60 is squeezed by the electronic device, the second end 61 moves toward the avoidance groove 121, so that the bent portion 62 can be squeezed, thereby reducing the bulging volume of the bent portion 62.

Optionally, the metal conductive member 60 and the second shell 12 are integrally injection molded, so that an installation between them can be avoided, and the compact structure and the reduced product size can be achieved.

The present application also provides an electronic device including a shell (not shown in the figure) and a sounding device whose structure is referred to the above embodiment, in particular, the sounding device is installed in the shell and the shell 10 is in sealed contact with the shell. Specifically, the sealing ring 50 on the shell 10 is in sealing contact with an inner peripheral wall of the shell to prevent water from flowing into a rear side of the shell 10 from a sound outlet hole opened in the shell.

The above are only optional embodiments of the present application, and are not therefore limiting the patent scope of the present application. Any equivalent structural transformation made by using the contents of the present specification and drawings, or any direct/indirect application in other related technical fields under the inventive concept of the present application are included in the patent scope of the present application.

The invention claimed is:

1. A sounding device comprising:

an outer shell having two ends communicating with each other and comprising a first shell and a second shell, wherein the first shell and the second shell are distributed along a direction from one of the two ends to another of the two end and engaged with each other;

a diaphragm integrally formed with the first shell; and a side magnetic conductive plate integrally formed with the second shell, wherein an inner circumferential surface of the second shell is provided with a mounting groove, an outer edge of the side magnetic conductive plate is adapted to the mounting groove, the side magnetic conductive plate is in an annular shape, and the mounting groove is extended in a circumferential direction of the second shell to form an annular shape; or a plurality of side magnetic conductive plates provided at intervals along a circumferential direction of the second shell, wherein an inner circumferential surface of the second shell is provided with a plurality of mounting grooves, and each of the plurality of side magnetic conductive plates is configured to insert into one of the plurality of mounting grooves.

2. The sounding device according to claim 1, wherein an inner circumferential surface of the first shell is provided with a fixing protrusion, an outer edge of the diaphragm is formed with a fixing groove, and the fixing protrusion is embedded in the fixing groove.

3. The sounding device according to claim 2, wherein the fixing protrusion is extended in a circumferential direction of the first shell to form an annular shape, and the fixing groove is extended in a circumferential direction of the diaphragm to form an annular shape.

4. The sounding device according to claim 1, wherein the diaphragm is molded on the first shell by an injection molding process.

5. The sounding device according to claim 1, wherein an outer circumferential surface of the first shell is sleeved with a sealing ring and is sealed and connected with a shell of an electronic equipment.

6. The sounding device according to claim 5, wherein the outer circumferential surface of the first shell is provided with a sealing groove, and the sealing ring is embedded in the sealing groove.

7. The sounding device according to claim 1, wherein, the first shell is molded by metal powder injection molding.

8. The sounding device of claim 1, wherein a surface of the second shell facing away from the first shell is penetrated by the mounting groove.

9. The sounding device according to claim 1, wherein the second shell is a plastic part.

10. The sounding device of claim 1, wherein the first shell and the second shell are welded or bonded.

11. The sounding device according to claim 1, wherein the sounding device further comprises a metal conductive member and a voice coil, one end of the metal conductive member is electrically connected to a lead of the voice coil, and another end of the metal conductive member is exposed outside of the sounding device and be electrically connected to an electronic equipment.

12. The sounding device according to claim 11, wherein the metal conductive member and the second shell are integrally injection molded.

* * * * *